United States Patent
Soika et al.

(10) Patent No.: US 8,401,601 B2
(45) Date of Patent: Mar. 19, 2013

(54) USE OF A TWO-PHASE SUPERCONDUCTING CABLE AS A POWER SUPPLY CABLE

(75) Inventors: Rainer Soika, Hannover (DE); Mark Stemmle, Hannover (DE)

(73) Assignee: Nexans, Paris (FR)

( * ) Notice: Subject to any disclaimer, the term of this patent is extended or adjusted under 35 U.S.C. 154(b) by 677 days.

(21) Appl. No.: 12/699,504

(22) Filed: Feb. 3, 2010

(65) Prior Publication Data
US 2010/0285967 A1 Nov. 11, 2010

(30) Foreign Application Priority Data
Feb. 4, 2009 (EP) .................................. 09290084

(51) Int. Cl.
H01L 39/24 (2006.01)
(52) U.S. Cl. ......................................................... 505/230
(58) Field of Classification Search .................. 505/230, 505/231, 232
See application file for complete search history.

(56) References Cited

FOREIGN PATENT DOCUMENTS
| WO | 00/39813 | * | 7/2000 |
| WO | 2008148390 | * | 12/2008 |

* cited by examiner

Primary Examiner — Colleen Dunn
(74) Attorney, Agent, or Firm — Sofer & Haroun, LLP

(57) ABSTRACT

An arrangement of a two-phase superconducting cable as a power supply cable in two-phase power distribution networks for electric railways include two phase conductors which are arranged coaxially with respect to one another and are separated from one another by an inner dielectric. A cryostat, with the superconducting cable arranged therein, has two tubes which run co-axially and at a distance from one another with vacuum insulation between them, where in addition to the superconducting cable, the cryostat surrounds a free space for a coolant to be passed through, and where an outer dielectric is fitted over the outer phase conductor of the superconducting cable.

2 Claims, 1 Drawing Sheet

USE OF A TWO-PHASE SUPERCONDUCTING CABLE AS A POWER SUPPLY CABLE

RELATED APPLICATIONS

This application claims the benefit of priority from European Patent Application No. 09290084.4, filed on Feb. 4, 2009, the entirety of which is incorporated by reference.

BACKGROUND

1. Field of the Invention

The invention relates to the use of a two-phase superconducting cable as a power supply cable.

A superconducting cable such as this which is suitable for alternating current and direct current is disclosed in WO 2008/148390 A1.

2. Description of Related Art

Arrangements and supply systems with superconducting cables are known and have been in use throughout the world for many years. In this case, this may be an arrangement for high-voltage direct-current transmission (HVDCT), for example, for which transmission elements equipped with two cables are used. One such transmission element is, for example, an underwater cable, which can be used to bridge long distances. However, arrangements such as these are also used in two-phase alternating-current networks, for example for the power supply for electric railways. The two phases of a corresponding two-phase supply system are, for example, in this case suspended on pylons, separately from one another. Electrical losses and undesirable voltage drops occur in the known two-phase supply systems.

The initially mentioned WO 2008/148390 A1 discloses an arrangement for supplying electric current to loads by means of a two-phase electrical cable which is in the form of a superconducting cable with two phase conductors, which are coaxial with respect to one another, are separated from one another by an inner dielectric, and are combined to form a unit.

OBJECTS AND SUMMARY

The invention is based on the object of designing an arrangement with a superconducting cable such that the cable can be used in a two-phase supply system with low losses and low voltage drops.

This cable allows a power supply with very low losses to be provided for a two-phase alternating-current system, and a power supply with virtually no losses to be provided for a direct-current system. In this case, a superconducting cable is used which is equipped with only two superconducting phase conductors, in contrast to the known single-conductor technology and the three-conductor technology as used in the alternating-current field. The two-phase supply system using this cable can be installed particularly easily, because only a single component may be fitted, specifically the cryostat, in which the superconducting cable is arranged with the two superconducting phases combined to form a unit. This is particularly advantageous for the design of two-phase power distribution networks for power supplies for electric railways. The phase voltage in a network such as this is, for example, 110 kV in Germany. Since electrical railways in many European countries use alternating current at a frequency of 16.7 Hz this results additionally in the alternating-current losses being reduced by a factor of "3" in comparison to the 50 Hz polyphase system for general power supplies.

Since the two coaxial phase conductors of the cable—both for direct current and for two-phase alternating current—are operated with a phase shift of 180°, their electromagnetic fields cancel one another out, as a result of which no electromagnetic fields exist outside the arrangement or the cryostat.

With modern technology, a superconducting cable has electrical conductors composed of a composite material, which contains ceramic material which changes to the superconducting state at sufficiently low temperatures. The electrical direct-current resistance of an appropriately designed conductor is zero, providing sufficient cooling is used, and providing a specific current level is not exceeded. By way of example, suitable ceramic materials are ReBCO (rare earth-barium-copper oxide), in particular YBCO (yttrium-barium-copper oxide) or BSCCO (bismuth-strontium-calcium-copper oxide). By way of example, sufficiently low temperatures to change materials such as this to the superconducting state are between 67K and 110K. By way of example, suitable coolants are nitrogen, helium, neon and hydrogen, or mixtures of these substances.

BRIEF DESCRIPTION OF THE DRAWINGS

Exemplary embodiments of the subject matter of the invention are illustrated in the drawings, in which.

DETAILED DESCRIPTION

Figure 1:
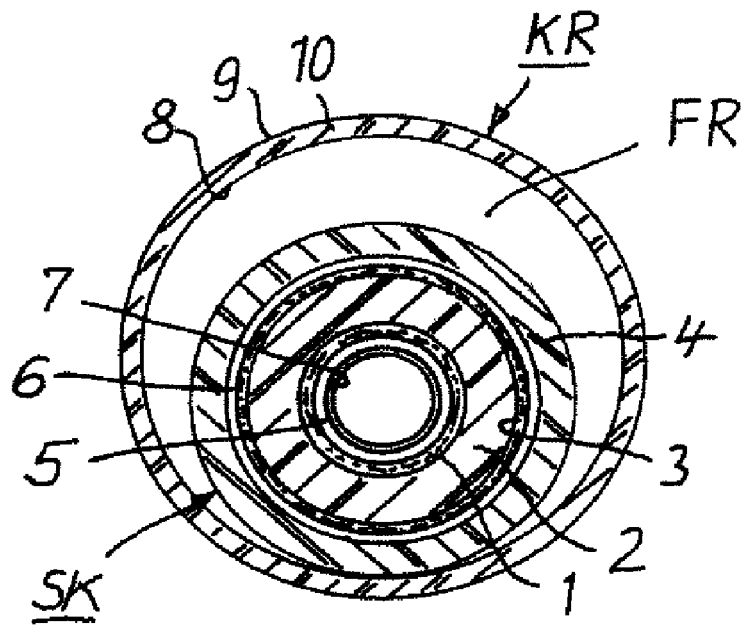
FIGS. 1 and 2 show cross sections through two cables with cryostats surrounding them, in different embodiments which can be used according to the invention.

FIG. 1 shows a superconducting cable SK which is arranged in a cryostat KR and has a cold dielectric. The cable SK comprises an inner phase conductor 1, an inner dielectric 2 surrounding it, and an outer phase conductor 3 surrounding the inner dielectric 2, over which an outer dielectric 4 is arranged. The two phase conductors 1 and 3 may advantageously be composed of YBCO or BSCCO. They can be stabilized by a normal conductor which is composed, for example, of copper and rests thereon. In this case, an inner normal conductor 5 rests internally on the inner phase conductor 1, while an outer normal conductor 6 rests externally on the outer phase conductor 3. The inner phase conductor 1—possibly with the interposition of the inner normal conductor 5—is fitted to a support 7 with a circular cross section, which is preferably in the form of a tube, as shown in the drawing illustration. When the arrangement is in operation, a coolant can be passed through the tube. The support 7 may, however, also be in the form of a solid section.

The cryostat KR comprises two metallic tubes 8 and 9, which are arranged concentrically with respect to one another and at a distance from one another. Vacuum insulation 10 is located between the two tubes 8 and 9. The tubes 8 and 9 are advantageously composed of stainless steel, and may be corrugated transversally with respect to their longitudinal direction. The cryostat KR surrounds a free space FR for a coolant to be passed through, and in which the cable SK is also arranged.

Figure 2:
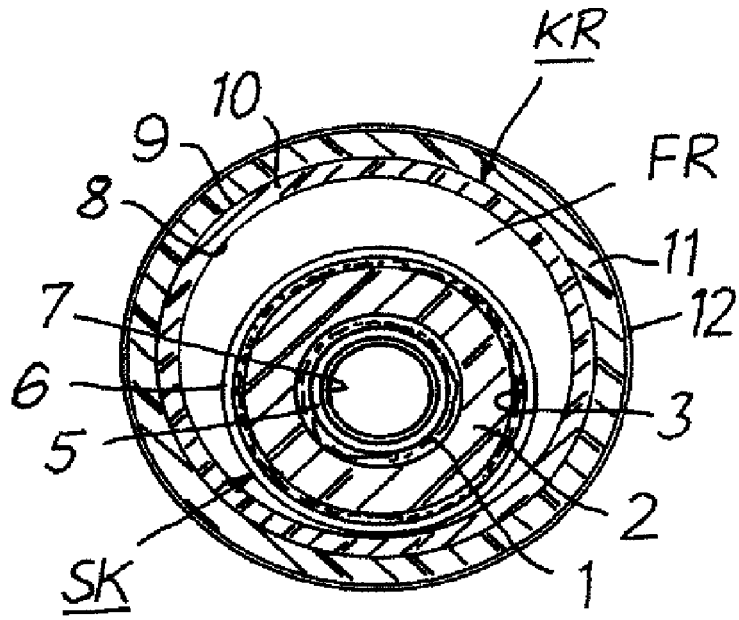

The superconducting cable SK as shown in FIG. 2 is a cable with a cold and a hot dielectric. Its design corresponds essentially to that of the cable SK shown in FIG. 1, but without the outer dielectric 4 surrounding the outer phase conductor 3. In this embodiment of the cable SK, or of the entire arrangement, the cryostat KR is surrounded by an outer dielectric 11, over which a casing 12 composed of insulating material may be fitted.

The invention claimed is:
1. An arrangement of a two-phase superconducting cable as a power supply cable in two-phase power distribution networks for electric railways comprising:
   two superconductive phase conductors which are arranged coaxially respect to one another and are separated from one another by an inner dielectric; and
   a cryostat, with said superconducting cable being arranged therein, said cryostat having two tubes which run coaxially and at a distance from one another vacuum insulation between them,
   wherein in addition to the superconducting cable, said cryostat surrounds a free space for a coolant to be passed through, and wherein an outer dielectric is rested directly on and in contact with the outer phase conductor of the superconducting cable.

2. The arrangement as claimed in claim 1, wherein each of the two phase conductors is stabilized by a normal conductor which rests on it.

* * * * *

UNITED STATES PATENT AND TRADEMARK OFFICE
CERTIFICATE OF CORRECTION

PATENT NO. : 8,401,601 B2  
APPLICATION NO. : 12/699504  
DATED : March 19, 2013  
INVENTOR(S) : Soika et al.

Page 1 of 1

It is certified that error appears in the above-identified patent and that said Letters Patent is hereby corrected as shown below:

In the Claims

Claim 1 Line 6: the word "with" is missing

Claim 1 Line 10: the word "with" is missing

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,401,601 B2  
APPLICATION NO. : 12/699504  
DATED : March 19, 2013  
INVENTOR(S) : Soika et al.

Page 1 of 1

It is certified that error appears in the above-identified patent and that said Letters Patent is hereby corrected as shown below:

In the Claims

Column 3, line 6 (claim 1, line 5) after "coaxially" insert -- with --.

Column 3, line 10 (claim 1, line 9) after "another" insert -- with --.

This certificate supersedes the Certificate of Correction issued May 14, 2013.

Signed and Sealed this
Eleventh Day of June, 2013

Teresa Stanek Rea
*Acting Director of the United States Patent and Trademark Office*